United States Patent
Corrion

(10) Patent No.: US 6,336,659 B1
(45) Date of Patent: Jan. 8, 2002

(54) AIR BAG MODULE WITH INFLATOR SHIELD

(75) Inventor: Edward J. Corrion, Phoenix, AZ (US)

(73) Assignee: TRW, Inc., Lyndhurst, OH (US)

(*) Notice: Subject to any disclaimer, the term of this patent is extended or adjusted under 35 U.S.C. 154(b) by 0 days.

(21) Appl. No.: 09/571,642

(22) Filed: May 15, 2000

(51) Int. Cl.[7] .............................................. B60R 21/26
(52) U.S. Cl. ..................... 280/736; 280/742; 280/728.1
(58) Field of Search ............................. 280/742, 728.1, 280/731, 732, 736, 743.1

(56) References Cited

U.S. PATENT DOCUMENTS

| | | |
|---|---|---|
| 3,843,151 A | 10/1974 | Lewis |
| 5,226,671 A | 7/1993 | Hill |
| 5,286,054 A * | 2/1994 | Cuevas ........................ 280/738 |
| 5,520,415 A * | 5/1996 | Lewis et al. ................. 280/732 |
| 5,636,861 A | 6/1997 | Orsulak et al. |
| 5,893,578 A * | 4/1999 | Berger ..................... 280/728.1 |
| 5,944,342 A | 8/1999 | White, Jr. et al. |
| 6,161,864 A * | 12/2000 | Heilig ........................ 280/732 |

FOREIGN PATENT DOCUMENTS

DE 2152635 10/1971

* cited by examiner

*Primary Examiner*—Peter C. English
(74) *Attorney, Agent, or Firm*—Tarolli, Sundheim, Covell, Tummino & Szabo L.L.P.

(57) ABSTRACT

An apparatus (10) for helping to protect a vehicle occupant comprises an inflatable device (12) having an inflation fluid opening (42). The apparatus also comprises an inflator (14) actuatable to provide inflation fluid for inflating the inflatable device (12). The inflator (14) has a portion (20) extending through the inflation fluid opening (42) and having an outer side surface (22) and an end surface (24). The inflator (14) has at least one fluid outlet (26) disposed within the inflatable device (12) for directing inflation fluid from the inflator into the inflatable device. A rupturable cover (50) covers the inflatable device (12) and the inflator (14). The apparatus (10) further comprises a plurality of flaps (70, 80) having end portions (74, 82) anchored to the inflator (14) and having body portions (76, 86) extending from the end portions. The flaps (70, 80) have a first condition, when the inflatable device (12) is in the deflated condition, in which the body portions (76, 86) of the flaps overlie the fluid outlet (26) and overlie the end surface (24) of the inflator (14). The flaps (70, 80) are movable in response to the flow of inflation fluid from the fluid outlet (26) from the first condition to a second condition. In the second condition, the flaps are moved away from the end surface (24) of the inflator (14) and away from the fluid outlets to enable flow of inflation fluid into the inflatable device (12). The flaps (70, 80) block contact between the inflation fluid and the inflatable device (12) upon actuation of the inflator (14) until the cover (50) ruptures and opens.

12 Claims, 3 Drawing Sheets

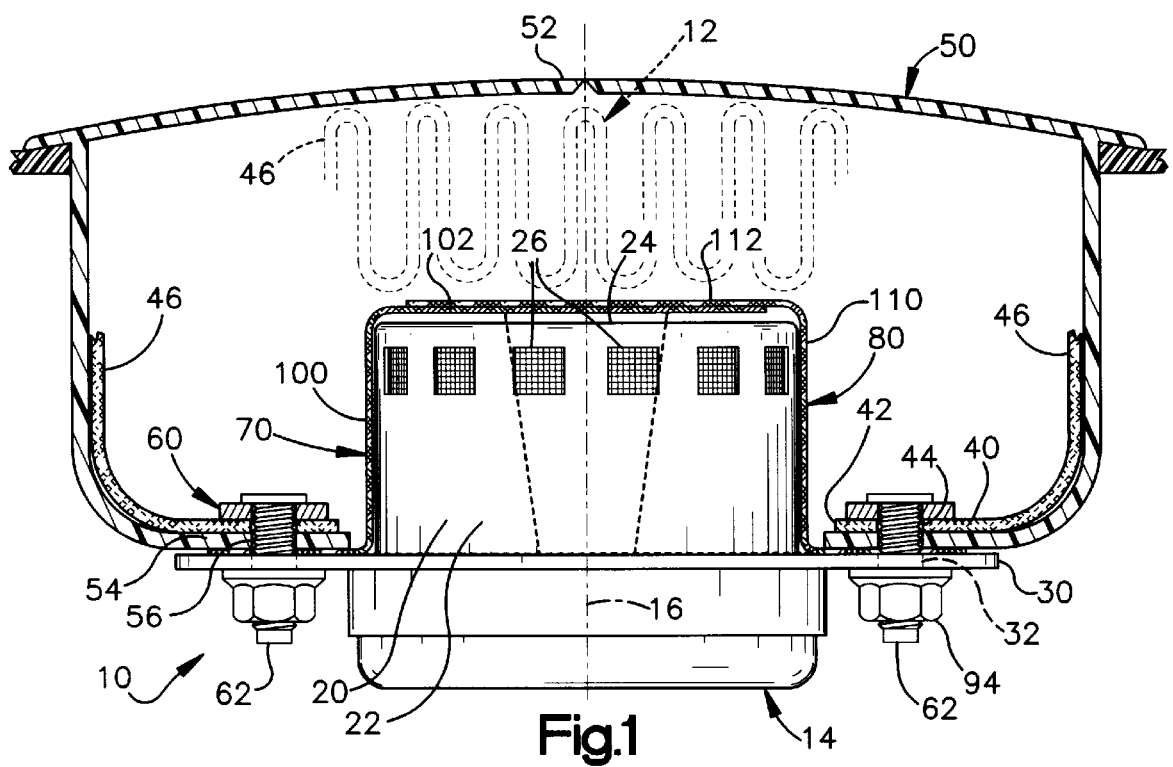
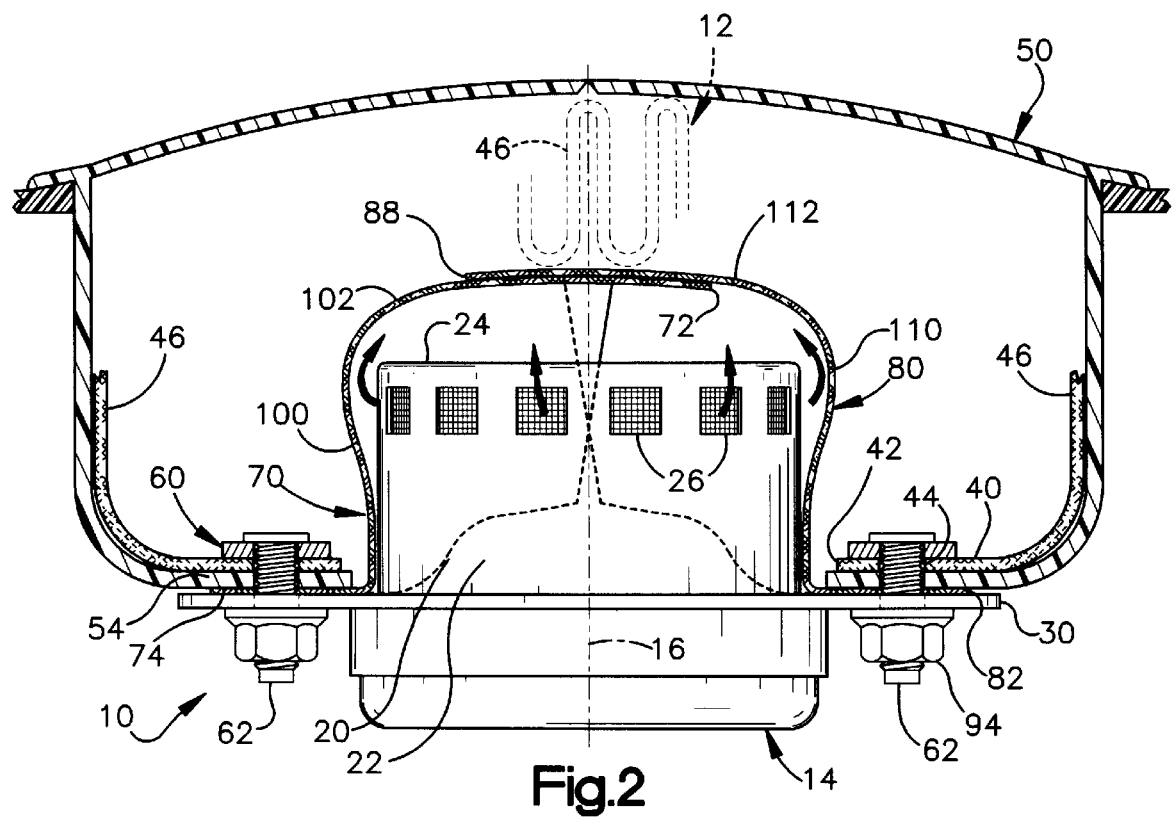

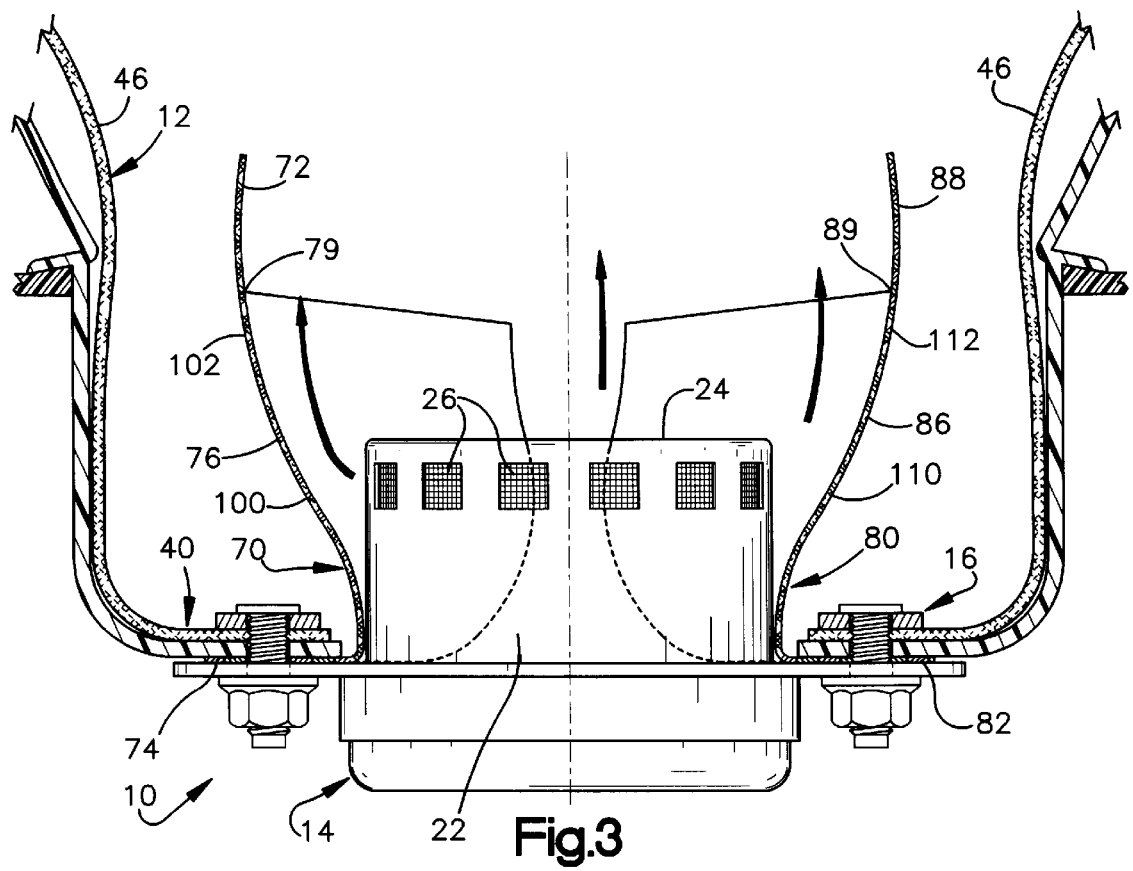
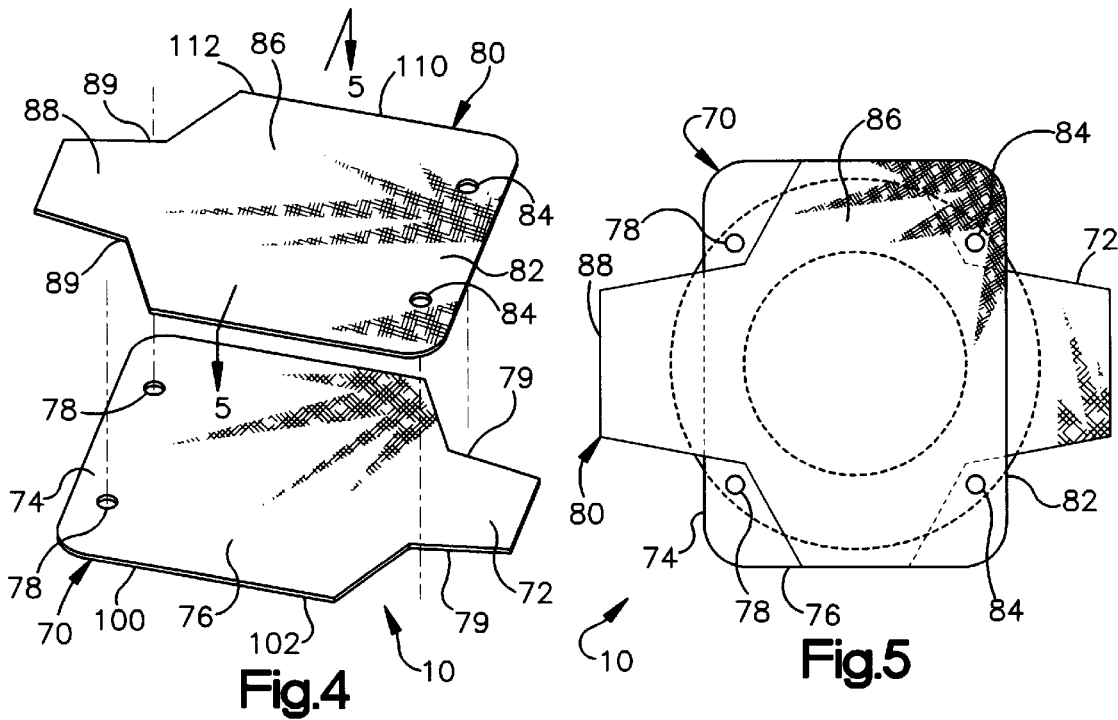

AIR BAG MODULE WITH INFLATOR SHIELD

BACKGROUND OF THE INVENTION

1. Technical Field

The present invention relates to an apparatus for helping to protect a vehicle occupant in the event of an impact to the vehicle. In particular, the invention relates to an air bag module including an air bag.

2. Description of the Prior Art

It is known to inflate an air bag to help protect a vehicle occupant in the event of an impact to a vehicle of a magnitude above a predetermined threshold. The air bag is stored in a deflated condition, together with an inflator, in a portion of the vehicle such as the vehicle steering wheel. In the event of a vehicle collision, the inflator is actuated and provides inflation fluid which inflates the air bag to help protect the vehicle occupant.

Some air bag inflators produce inflation fluid through combustion of a pyrotechnic material. The combustion products in the initial flow of inflation fluid from the inflator may include hot particulate matter or hot gases, which might cause damage to the material of the air bag. It is desirable to prevent such damage from occurring. U.S. Pat. No. 5,944,342 shows an air bag module with a rupturable heat shield for protecting the air bag.

SUMMARY OF THE INVENTION

The present invention is an apparatus for helping to protect an occupant of a vehicle. The apparatus comprises an inflatable vehicle occupant protection device having an inflation fluid opening and being inflatable from a deflated condition to an inflated condition for helping to protect the vehicle occupant. The apparatus also comprises an inflator actuatable to provide inflation fluid for inflating the inflatable device. The inflator has a portion extending through the inflation fluid opening and having an outer side surface and an end surface. The inflator has at least one fluid outlet disposed within the inflatable device for directing inflation fluid from the inflator into the inflatable device. The apparatus includes a rupturable cover covering the inflatable device and the inflator. The apparatus further comprises a plurality of flaps having end portions anchored to the inflator and having body portions extending from the end portions. The flaps have a first condition, when the inflatable device is in the deflated condition, in which the body portions of the flaps overlie the fluid outlet and overlie the end surface of the inflator. The flaps are movable in response to the flow of inflation fluid from the fluid outlet from the first condition to a second condition. In the second condition, the flaps are moved away from the end surface of the inflator and away from the fluid outlets to enable flow of inflation fluid into the inflatable device. The flaps block contact between the inflation fluid and the inflatable device upon actuation of the inflator until the cover ruptures and opens.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a sectional view of air bag module constructed in accordance with the present invention, including an inflator and an air bag shown in a deflated condition;

FIG. 2 is a view similar to FIG. 1 showing the air bag module in a condition shortly after actuation of the inflator;

FIG. 3 is a view similar to FIG. 2 showing the air bag in a subsequent condition of inflation;

FIG. 4 is an exploded perspective view of two flaps that form a part of the air bag module of FIG. 1;

FIG. 5 is a schematic plan view of the two flaps and the inflator in a condition prior to assembly;

DETAILED DESCRIPTION OF EMBODIMENTS OF THE INVENTION

Figure 6:
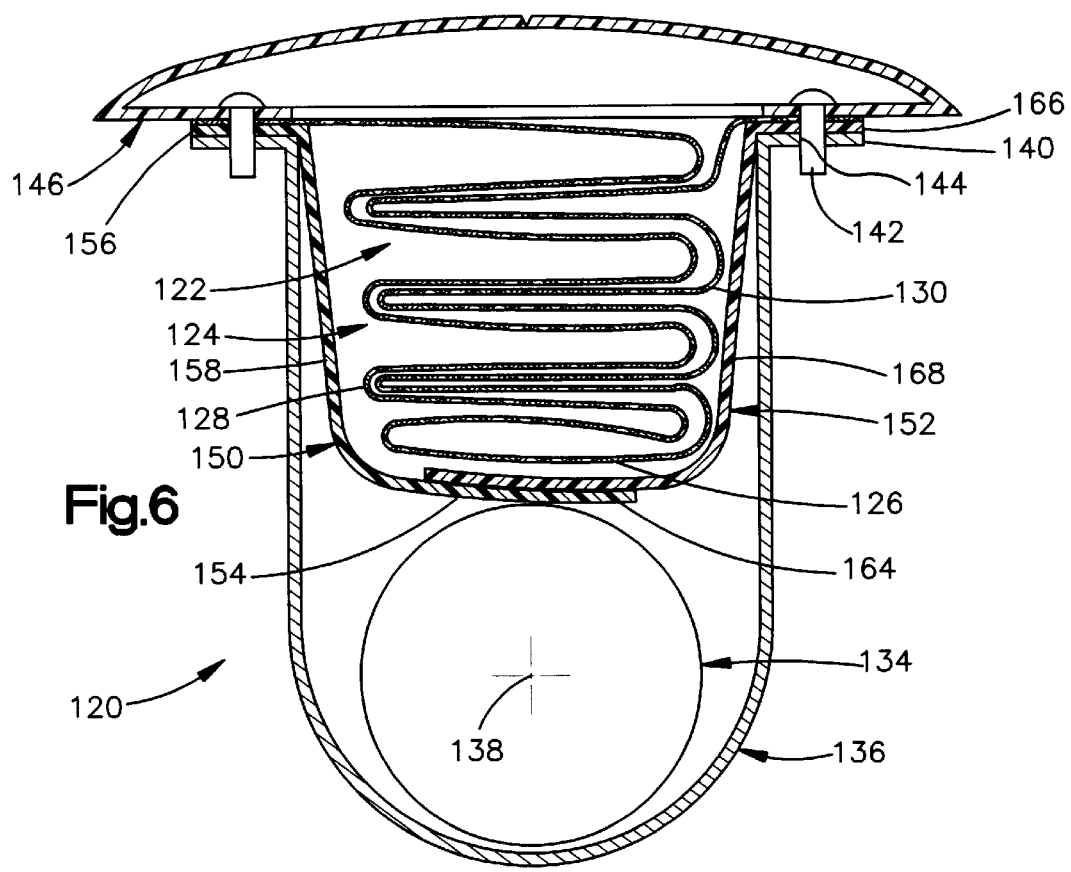
FIG. 6 is an exploded perspective view of an air bag module constructed in accordance with a second embodiment of the invention.

The present invention relates to an apparatus including an inflatable vehicle occupant protection device for helping to protect a vehicle occupant in the event of a vehicle collision. The present invention is applicable to various constructions of an apparatus for helping to protect a vehicle occupant. As representative of the present invention, FIG. 1 illustrates such an apparatus or air bag module 10. The air bag module 10 includes an inflatable vehicle occupant protection device in the form of an air bag 12, and an inflator 14.

The inflator 14 is illustrated as a driver's side inflator and comprises a source of inflation fluid for inflating the air bag 12. The inflator preferably contains an ignitable gas generating material which, when ignited, rapidly produces a volume of gas to inflate the air bag 12. Alternatively, the inflator 14 could contain a stored quantity of pressurized inflation fluid, or could contain a combination of pressurized inflation fluid and ignitable material for heating the pressurized inflation fluid.

The inflator 14 has a longitudinal central axis 16 and includes a cylindrical main body portion 20. The main body portion 20 has a cylindrical outer side surface 22 extending parallel to the central axis 16. The main body portion also has a circular, radially extending end surface 24 located at an upper (as viewed in FIG. 1) end of the inflator. A plurality of inflation fluid outlets 26 are formed in the outer side surface 22 of the main body portion of the inflator for directing inflation fluid out of the inflator 14 into the air bag 12.

A mounting flange 30 projects radially outward from a lower (as viewed in FIG. 1) end of the inflator 14. The mounting flange 30 has a circumferentially spaced array of fastener openings 32. Lead wires (not shown) extend from the lower end of the inflator 14 and are electrically connected with vehicle electric circuitry (not shown) for actuating the inflator, as known in the art.

The air bag 12 is made from a fabric material, such as woven nylon. A mouth portion 40 of the air bag 12 includes a central opening 42 through which the main body portion 20 of the inflator 14 extends. A circumferentially spaced plurality of fastener openings 44 are located in the mouth portion 40 of the air bag 12. A main body portion 46 of the air bag 12 extends from the mouth portion 40. Parts of the main body portion 46 of the air bag 12 are omitted for clarity in FIGS. 1–3.

The air bag module 10 further includes a cover 50, which covers the folded air bag 12 and the inflator 14. The cover 50 has a rupturable portion 52, which is visible in the vehicle when the air bag module 10 is mounted in the vehicle. The cover 50 also has a mounting portion 54, which extends radially inward toward the axis 16 at a location between the air bag mouth portion 40 and the inflator mounting flange 30 and which includes a circumferentially spaced plurality of fastener apertures 56.

The air bag module 10 includes a retaining ring 60, which is generally circular in shape and circumscribes the inflator 14. The retaining ring 60 overlies the mouth portion 40 of the air bag 12. The retaining ring 60 includes four mounting studs 62 for extending through the openings 44 in the air bag 12, the openings 56 in the cover 50, and the openings 32 in the inflator mounting flange 30.

The air bag module 10 includes a plurality of flaps for blocking contact between the air bag 12 and the initial flow of inflation fluid from the inflator 14. In the illustrated embodiment, an inner flap 70 and an outer flap 80 are provided, but the number of flaps may vary depending on the application. The flaps 70 and 80 are generally rectangular in shape and made from a flexible material such as the woven nylon material of which the air bag 12 is made.

The inner flap 70 (FIGS. 2 and 4) has inner and outer end portions 72 and 74 and a central or main body portion 76. The outer end portion 74 of the inner flap 70 has two fastener openings 78. The fastener openings 78 are spaced apart by a distance substantially equal to the distance between two adjacent studs 62 on the retaining ring 60. Notches 79 are cut in the corners of the inner end portion 72 for a reason described below.

The outer flap 80 (FIGS. 2 and 4) is similar in size and shape to the inner flap 70. The outer flap 80 has an outer end portion 82 that has two fastener openings 84. The fastener openings 84 are spaced apart by a distance substantially equal to the distance between any two adjacent studs 62 on the retaining ring 60. A central or main body portion 86 of the outer flap 80 extends from the outer end portion 82 to an inner end portion 88 of the outer flap. Notches 89 are cut in the corners of the inner end portion 88 for a reason described below.

The flaps 70 and 80 are installed in the air bag module 10 so that their outer end portions 74 and 82, respectively, are clamped between the mounting portion 54 of the cover 50 and the mounting flange 30 of the inflator 14. Specifically, the cover 50, the air bag 12, and the retaining ring 60 are first assembled as a unit or bag pack, so that the studs 62 on the retaining ring project from the fastener openings 56 in the mounting portion 54 of the cover 50.

The outer flap 80 is then positioned on the studs 62 of the retaining ring 60. The fastener openings 84 in the outer flap 80 receive two adjacent mounting studs 62 of the retaining ring 60. The notches 89 in the inner end portion 88 of the outer flap 80 permit the inner end portion to lie between the two studs 62 that do not extend through the outer flap 80.

The inner flap 70 is then placed over the outer flap 80 and positioned on the studs 62 of the retaining ring 60. The fastener openings 78 in the inner flap 70 receive the remaining two mounting studs 62 of the retaining ring 60. The notches 79 in the inner end portion 72 of the inner flap 70 permit the inner end portion to lie between the two studs 62 that do not extend through the inner flap. The inner and outer flaps 70 and 80 extend across and cover the central opening 42 in the mouth portion 40 of the air bag 12.

The inflator 14 is next positioned adjacent the assembled bag pack. The main body portion 20 of the inflator 14 is then moved into and through the central opening 42 in the mouth portion 40 of the air bag 12, in an upward direction as viewed in FIG. 1. This movement of the inflator 14 pushes the inner and outer flaps 70 and 80 apart and captures them between the main body portion 20 of the inflator and the packed main body portion 46 of the air bag 12, as shown in FIG. 1.

The fastener openings 32 in the inflator mounting flange 30 receive the studs 62 on the retaining ring 60. Nuts 94 screwed onto the studs 62 clamp the mouth portion 40 of the air bag 12 between the retaining ring 60 and the inflator mounting flange 30. The outer end portions 74 and 82 of the flaps 70 and 80, are thus anchored to (fixed in position relative to) the inflator 14, on opposite sides of the inflator.

When the air bag module 10 is in the assembled condition shown in FIG. 1, the main body portion 20 of the inflator 14 extends through the central opening 42 in the air bag 12. A first part 100 of the main body portion 76 of the inner flap 70 extends over the outer side surface 22 of the main body portion 20 of the inflator 14. The inner flap 70 is wide enough so that the first part 100 of the inner flap extends across and covers the inflation fluid outlets 26 in one circumferential half of the outer side surface 22. (See also FIG. 5, showing the relative position of the inflator 14 and the two flaps 70 and 80 prior to assembly. It can be seen that each of the flaps 70 and 80 is wide enough to cover one half the outer side surface 22 of the inflator 14 when assembled as described below.)

A second part 102 of the main body portion 76 of the inner flap 70 extends over the end surface 24 of the main body portion 20 of the inflator 14. The second part 102 of the inner flap 70 covers a substantial portion of the end surface 24 of the inflator 14.

A first part 110 of the main body portion 86 of the outer flap 80 extends over the outer side surface 22 of the main body portion 20 of the inflator 14. The outer flap 80 is wide enough so that the first part 110 of the outer flap extends across and covers those inflation fluid outlets 26 in the circumferential half of the outer side surface 22 that are not covered by the inner flap 70. A second part 112 of the main body portion 86 of the outer flap 80 extends over the end surface 24 of the main body portion 20 of the inflator 14. The second part 112 of the outer flap 80 covers a substantial portion of the end surface 24 of the inflator 14.

The second part 112 of the main body portion 86 of the outer flap 80 overlies the second part 102 of the main body portion 76 of the inner flap 70. Thus, the two flaps 70 and 80 overlap for a substantial extent, on the end surface 24 of the inflator 14.

The vehicle in which the air bag module 10 is mounted includes known electrical means (not shown) for sensing an impact to the vehicle and for actuating the inflator 14 in response to the sensing of an impact. The electrical means may include a deceleration sensor and vehicle circuitry for electrically actuating the inflator 14 in response to sensing vehicle deceleration greater than a predetermined threshold value for which inflation of the air bag 12 is desired to help protect the vehicle occupant.

The electrical means is electrically connected with the inflator 14 for providing an actuation signal to the inflator. When the inflator 14 is actuated, inflation fluid flows out of the inflator through the inflation fluid outlets 26 in the outer side surface 22 of the main body portion 20 of the inflator. The inflation fluid flowing from the inflator 14 engages the first part 100 of the main body portion 76 of the inner flap 70, and the first part 110 of the main body portion 86 of the outer flap 80. Because the flaps 70 and 80 are interposed between the inflation fluid outlets 26 and the main body portion 46 of the air bag 12, the initial flow of inflation fluid from the inflator 14 is blocked from contacting the material of the air bag itself.

The force of the inflation fluid flowing from the inflation fluid outlets 26 is great enough to move the flaps 70 and 80 away from the inflation fluid outlets after a brief period of time. As the flaps 70 and 80 move away from the inflation fluid outlets 26, their anchored outer end portions 74 and 82, respectively, remain in place, but their inner end portions 72 and 88 are free to move. The flaps 70 and 80 move from the fully overlapped condition shown in FIG. 1 to the partially overlapped condition shown in FIG. 2, in which the flaps are partially moved away from the inflation fluid outlets 26. In this condition, the flaps 70 and 80 still overlap each other along the end surface 24 of the inflator 14, but by a smaller amount than before.

As more inflation fluid flows from the inflation fluid outlets 26, the flaps 70 and 80 move away from the end surface 24 of the inflator 14 and farther away from the inflation fluid outlets 26. The flaps 70 and 80 move to a position as shown in FIG. 3 in which the flaps no longer overlap each other but instead enable flow of inflation fluid directly into the main body portion 46 of the air bag 12. This movement does not occur until a predetermined period of time after actuation of the inflator 14, typically about one to three milliseconds. The predetermined time period is selected so that there is normally little, if any, hot particulate matter in the inflation fluid being produced after the predetermined time period. As a result, most particles that may be present in the initial flow of inflation fluid from the inflator 14 and that may be hot enough to burn or otherwise damage the fabric material of the air bag 12, contact the flaps 70 and 80. Most of the particles do not come into contact with the main panel of the body portion 46 of the air bag 12.

The flaps 70 and 80 cover enough of the inflator 14, and overlap enough, that they block contact between the inflation fluid and the air bag 12 until the cover 50 ruptures and opens. Once the cover 50 ruptures and opens, the air bag 12 rapidly moves away from the inflator 14, and little or no damage results from contact of the inflation fluid with the material of the air bag.

Figure 7:
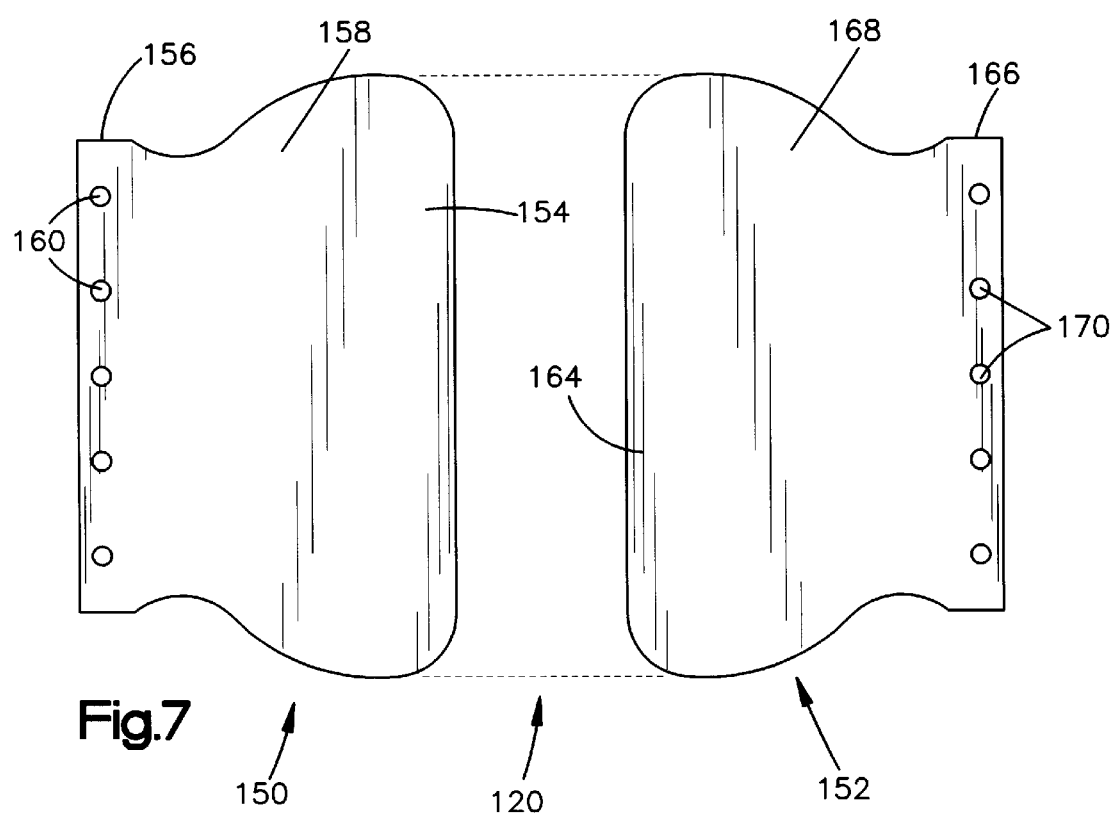
FIG. 7 is a sectional view of the air bag module of FIG. 6.

FIG. 6 and 7 illustrate an air bag module 120 constructed in accordance with a second embodiment of the invention. The air bag module 120 is a passenger side air bag module including a cylindrical inflator and including a plurality of flaps for helping to protect the air bag against an initial flow of fluid from the inflator.

The air bag module 120 includes an air bag 122. The air bag 122 is folded into a compact shape to form a bag pack 124. The bag pack 124 has a bottom (as viewed in FIG. 6) surface 126, and outer side surfaces 128 and 130.

The air bag module 120 also includes a cylindrical inflator, illustrated schematically at 134, in a U-shaped housing or reaction canister 136. The inflator 134 has a cylindrical configuration centered on its longitudinal central axis 138. The axis 138 extends parallel to the longitudinal extent of the housing 136.

The housing 136 has a bag mounting flange 140. A plurality of fasteners 142 extend through fastener openings in the flange 140 to secure the air bag 122 to the housing 136. The air bag module 120 also includes a cover or deployment door 146 which is fixed to the housing 136 by the fasteners 142. The cover 146 is spaced apart from the inflator 134 in a direction transverse to the axis 138 (upward as viewed in FIG. 6).

The air bag module 120 includes a plurality of flaps for blocking contact between the air bag 122 and the initial flow of inflation fluid from the inflator 134. In the illustrated embodiment, an inner flap 150 and an outer flap 152 are provided, but the number of flaps may vary depending on the application. The flaps 150 and 152 may be made from the same material as the flaps 70 and 80 (FIGS. 1–5).

The inner flap 150 (FIGS. 6 and 7) has inner and outer end portions 154 and 156 and a central or main body portion 158. The outer end portion 156 of the inner flap 150 has a row of fastener openings 160. The inner end portion 154 of the inner flap 150 is wider than the outer end portion 156.

The outer flap 152 is similar in size and shape to the inner flap 150. The outer flap 152 has inner and outer end portions 164 and 166 and a central or main body portion 168. The outer end portion 166 of the outer flap 152 has a row of fastener openings 170. The inner end portion 164 of the outer flap 152 is wider than the outer end portion 166.

The flaps 150 and 152 (FIG. 6) are installed in the air bag module 120 so that their outer portions 156 and 166, respectively, are clamped between the air bag 122 and the mounting flange 140 of the housing 136. The outer end portions 156 and 166 of the flaps 150 and 152 are thereby fixed in position relative to the inflator 134.

The inner end portion 154 of the inner flap 150 is disposed between the inflator 134 and the inner end portion 164 of the outer flap 152. The inner end portions 154 and 164 of the flaps 150 and 152 overlie each other, at a location between the inflator 134 and the bottom surface 126 of the bag pack 124. The axis 138 of the inflator 134 does not extend through the flaps 150 and 152.

When the inflator 134 is actuated, inflation fluid flows out of the inflator and engages the inner end portion 154 of the inner flap 150. Because the flaps 150 and 152, especially the inner flap 150, are interposed between the inflator 134 and the air bag 122, the initial flow of inflation fluid from the inflator is blocked from contacting the material of the air bag itself.

The force of the inflation fluid flowing from the inflator 134 is great enough to move the flaps 150 and 152 away from the inflator after a brief period of time. As the flaps 150 and 152 move away from the inflator 134, their anchored outer end portions 156 and 166, respectively, remain in place, but their inner end portions 154 and 164 are free to move.

The force of the inflation fluid causes the flaps 150 and 152 to push the air bag 122 outward against the cover 146, in a direction transverse to the axis 138. This force eventually causes the cover 146 to open, allowing the air bag 122 to inflate out of the housing 136 into a position to help protect a vehicle occupant.

Until the cover 146 opens, the flaps 150 and 152 are disposed between the inflator 134 and the air bag 122, and shield the air bag from direct contact with the initial flow of inflation fluid from the inflator. After the cover 146 opens, the flaps 150 and 152 move to a position (not shown) in which the flaps no longer overlap each other but instead enable flow of inflation fluid directly into the air bag 122. This movement does not occur until a predetermined period of time after actuation of the inflator 134, typically at least about one to three milliseconds. The predetermined time period is selected so that there is normally little, if any, hot particulate matter in the inflation fluid being produced after the predetermined time period. As a result, most particles that may be present in the initial flow of inflation fluid from the inflator 134 and that may be hot enough to burn or otherwise damage the fabric material of the air bag 122, contact the flaps 150 and 152. Most of the particles do not come into contact with the air bag 122.

From the above description of the invention, those skilled in the art will perceive improvements, changes and modifications in the invention. Such improvements, changes and modifications within the skill of the art are intended to be covered by the appended claims.

Having described the invention I claim:

1. An apparatus for helping to protect an occupant of a vehicle, said apparatus comprising:

an inflatable vehicle occupant protection device having an inflation fluid opening and being inflatable from a deflated condition to an inflated condition for helping to protect the vehicle occupant;

an inflator actuatable to provide inflation fluid for inflating said inflatable device, said inflator having a portion extending through said inflation fluid opening, said portion of said inflator having an outer side surface and an end surface, said inflator having at least one fluid outlet disposed within said inflatable device for directing inflation fluid from said inflator into said inflatable device;

a rupturable cover covering said inflatable device and said inflator; and a plurality of flaps having end portions anchored to said inflator and having body portions extending from said end portions;

said flaps having a first condition, when said inflatable device is in the deflated condition, in which said body portions of said flaps overlie said fluid outlet and overlie said end surface of said inflator;

said flaps being movable in response to the flow of inflation fluid from said fluid outlet from the first condition to a second condition in which said flaps are moved away from said end surface of said inflator and away from said fluid outlet to enable flow of inflation fluid into said inflatable device;

said flaps blocking contact between the inflation fluid and said inflatable device upon actuation of said inflator until said cover ruptures and opens.

2. An apparatus as set forth in claim 1 wherein said body portions of said flaps overlap each other when said flaps are in the first condition and until said cover ruptures and opens.

3. An apparatus as set forth in claim 2 wherein said body portions of said flaps overlap each other along said end surface of said inflator.

4. An apparatus as set forth in claim 1 wherein said portion of said inflator has a cylindrical configuration centered on an axis and including a circular, radially extending end surface and a cylindrical outer side surface having a plurality of fluid outlet openings.

5. An apparatus as set forth in claim 1 wherein said plurality of flaps comprises first and second flaps, said end portions of said first and second flaps being anchored to said inflator on opposite sides of said inflator.

6. An apparatus as set forth in claim 5 wherein a first part of a body portion of said first flap overlies a plurality of fluid outlet openings on a first half of said outer side surface of said inflator, a second part of said body portion of said first flap overlies said end surface of said inflator, a first part of a body portion of said second flap overlies a plurality of fluid outlet openings on a second half of said outer side surface of said inflator, and a second part of said body portion of said second flap overlies said end surface of said inflator and also overlies said second part of said body portion of said first flap.

7. An apparatus as set forth in claim 1 comprising a plurality of fasteners for securing together said inflatable device and said inflator and said flaps, said fasteners extending through fastener openings in said end portions of said flaps.

8. An apparatus for helping to protect an occupant of a vehicle, said apparatus comprising:

an inflatable vehicle occupant protection device having an inflation fluid opening and being inflatable from a deflated condition to an inflated condition for helping to protect the vehicle occupant;

an inflator actuatable to provide inflation fluid for inflating said inflatable device, said inflator having at least one fluid outlet disposed within said inflatable device for directing inflation fluid from said inflator into said inflatable device; and a plurality of flaps having end portions anchored to said inflator and having body portions extending from said end portions;

said flaps having a first condition, when said inflatable device is in the deflated condition, in which said body portions of said flaps overlie said fluid outlet and overlap each other by a first amount along said inflator;

said flaps being movable in response to the flow of inflation fluid from said fluid outlet from the first condition to a second condition in which said flaps are moved away from said inflator and away from said fluid outlet and do not overlap each other, to enable flow of inflation fluid into said inflatable device;

said flaps blocking contact between the inflation fluid and said inflatable device for a predetermined period of time upon actuation of said inflator; and further comprising a rupturable cover covering said inflatable device and said inflator, and wherein said predetermined period of time extends until said cover ruptures and opens.

9. An apparatus for helping to protect an occupant of a vehicle, said apparatus comprising:

an inflatable vehicle occupant protection device inflatable from a deflated condition to an inflated condition for helping to protect the vehicle occupant;

an inflator actuatable to provide inflation fluid for inflating said inflatable device, said inflator directing inflation fluid from said inflator into said inflatable device;

a rupturable cover covering said inflatable device and said inflator; and a plurality of flaps having end portions fixed in position relative to said inflator and having body portions extending from said end portions;

said flaps having a first condition, when said inflatable device is in the deflated condition, in which said flaps overlap each other by a first amount at a location intermediate said inflator and said inflatable device;

said flaps being movable in response to the flow of inflation fluid from said inflator from the first condition to a second condition in which said flaps are moved away from said inflator and do not overlap each other, to enable flow of inflation fluid into said inflatable device;

said flaps blocking contact between the inflation fluid and said inflatable device upon actuation of said inflator until said cover ruptures and opens.

10. An apparatus as set forth in claim 9 wherein said flaps move away from said inflator in a direction transverse to a longitudinal axis of said inflator.

11. An apparatus as set forth in claim 9 wherein said flaps move away from said inflator in a direction parallel to a longitudinal axis of said inflator.

12. An apparatus for helping to protect an occupant of a vehicle, said apparatus comprising:

an inflatable vehicle occupant protection device having an inflation fluid opening and being inflatable from a deflated condition to an inflated condition for helping to protect the vehicle occupant;

an inflator actuatable to provide inflation fluid for inflating said inflatable device, said inflator having a fluid outlet directing inflation fluid from said inflator into said inflatable device;

a rupturable cover covering said inflatable device and said inflator; and a plurality of flaps having end portions anchored to said inflator and having body portions extending from said end portions;

said flaps having a first condition, when said inflatable device is in the deflated condition, in which said body portions of said flaps overlie said inflator;

said flaps being movable in response to the flow of inflation fluid from said fluid outlet from the first condition to a second condition in which said flaps are moved away from said inflator and away from said fluid outlet to enable flow of inflation fluid into said inflatable device;

said flaps blocking contact between the inflation fluid and said inflatable device upon actuation of said inflator until said cover ruptures and opens.

* * * * *